Figure 1:
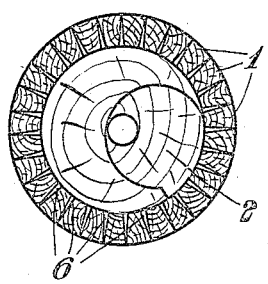

E. JOHANSSON.
HANDRAIL AND THE LIKE AND METHOD OF MANUFACTURING SAME.
APPLICATION FILED JUNE 7, 1919.

Patented Mar. 29, 1921.
2 SHEETS—SHEET 1

Inventor:
ERIK JOHANSSON

E. JOHANSSON.
HANDRAIL AND THE LIKE AND METHOD OF MANUFACTURING SAME.
APPLICATION FILED JUNE 7, 1919.

1,372,819.

Patented Mar. 29, 1921.
2 SHEETS—SHEET 2.

Inventor:
ERIK JOHANSSON

BY Featherstonhaugh & Co.
ATTY'S.

UNITED STATES PATENT OFFICE.

ERIK JOHANSSON, OF EDSBYN, SWEDEN.

HANDRAIL AND THE LIKE AND METHOD OF MANUFACTURING SAME.

1,372,819.   Specification of Letters Patent.   Patented Mar. 29, 1921.

Application filed June 7, 1919. Serial No. 302,536.

*To all whom it may concern:*

Be it known that I, ERIK JOHANSSON, a subject of the King of Sweden, residing at Edsbyn, in the Kingdom of Sweden, have invented a new and useful Improvement in Handrails and the like and Methods of Manufacturing Same, of which the following is a specification.

The present invention relates to an improvement in jointless curved rails and bars, particularly hand-rails to be used for staircases and the like, and to a method of manufacturing such rails and bars. Heretofore such curved rails have been manufactured by sawing curved pieces of a wooden board of sufficient width and thickness, and by joining the ends of said pieces so as to obtain a hand-rail of sufficient length. This method of manufacture is unsatisfactory in several respects, it being time-wasting, and the joints spoiling the look of the hand-rail and making it fragile.

The purpose of the present invention is to avoid the said disadvantages. The improved method of manufacture consists in assembling a number of pliable ribs having comparatively small width and thickness into a hollow bar or rail of the desired shape, the assembling being preferably made around a pliable core of wood. Said core may consist, for instance, of a wooden bar provided with a deep helical groove so as to become pliable. Bands are then attached and are tightened around the bar thus assembled by means of wedges or in other suitable manner. The assembled bar is then bent to the desired shape, and a strong adhesive is poured into the cavity formed by the groove in the core, so that the adhesive reaches the ribs. In order to obtain a good adhesion between the ribs the side faces of said ribs should be so arranged as to provide a space or slot between every two ribs on the inside of the bar into which spaces the adhesive may penetrate. The adhesive may preferably consist of a glue solution. When said adhesive has become dry the bands are removed, when a jointless rail of neat appearance is obtained.

Instead of a wooden bar with a deep helical groove a wooden strip or band wound helically may serve as a core, the turns or windings of said strip being placed at a distance from one another so that the adhesive poured into the bar may reach the ribs forming the shell of the bar or rail. Several advantages are hereby obtained. The aperture through which the adhesive must flow for reaching the ribs becomes larger, so that it is possible to use a stronger adhesive which is less liquid and consequently requires a larger space for flowing. When the bar has been filled and the lower end of the bar is opened, the superfluous adhesive may flow out which will allow the bar to dry rapidly, said drying being also facilitated by the fact that a large quantity of air may flow through the large aperture in the core.

It is also suitable to make the wedge-shaped slots or openings between the ribs somewhat wider on the inner side so that the adhesive will easily flow into the seams and along the outer face of the core. The ribs may be provided with tongues and grooves, so that the ribs will fit more easily, whereby the trimming of the completed rail will be facilitated and the surface of the rail formed by the ribs will become more tight so that the adhesive can not penetrate through the seams.

It is also possible to omit the core, in which case the ribs should be made somewhat thicker in the radial direction so as to provide sufficient strength and rigidness of the shell formed by the ribs.

Figure 2:
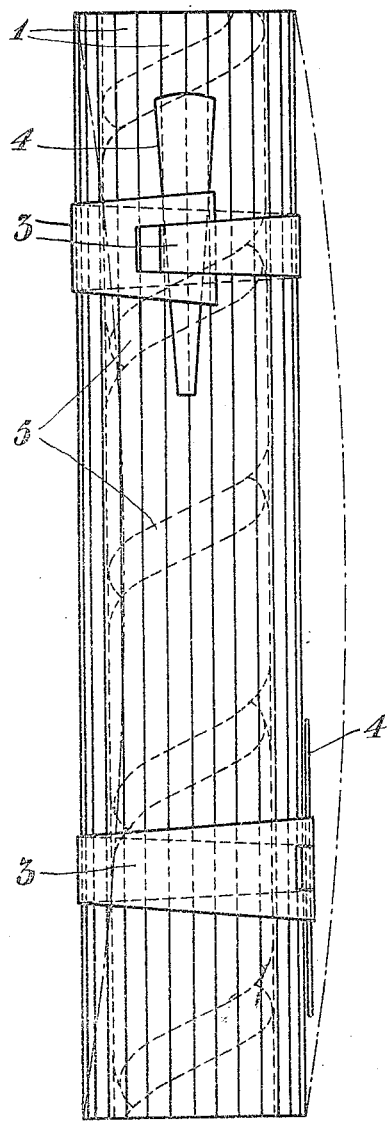
Figure 3:
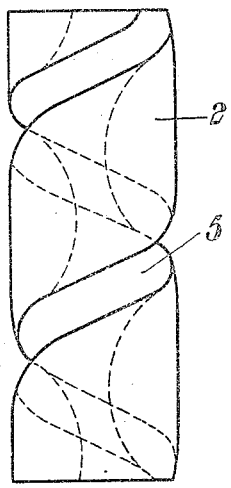
Figure 4:
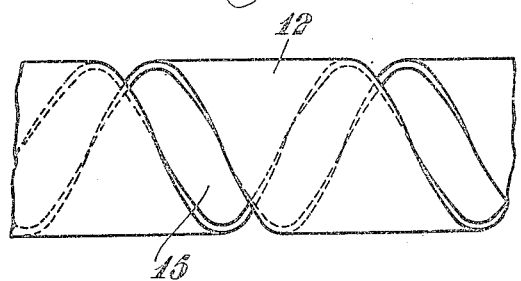
Figure 5:
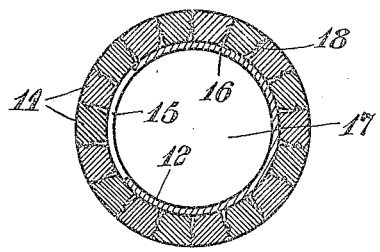

An embodiment of the invention is illustrated in the accompanying drawings, in which Figure 1 shows a cross section of a rail produced according to the present method, and Fig. 2 shows a side view of a portion of said rail. Fig. 3 shows a side view of the core. Fig. 4 shows a side view of another construction of the core, and Fig. 5 shows a cross section of a rail utilizing the core shown in Fig. 4.

Referring to Figs. 1 to 3, the ribs 1 are arranged around a core 2 provided with a helical groove 5, said ribs being retained in positions around said core by means of bands 3 which are tightened by the aid of wedges 4. As shown in Fig. 1 the ribs 1 are of such shape that there will be formed spaces or slots 6 having angular cross sections. between the ribs on the inside of the shell formed by the ribs. When the bar has been bent to the desired shape the adhesive is poured into one end of the bar, the adhesive flowing into the groove 5 and into the spaces 6 so that the ribs will be properly glued together.

In order to facilitate the flowing of the adhesive between the core and the ribs it is suitable to provide the core with cuts in its outer surface, or to make the outer surface of the screw thread formed in the core convex so that the middle portion of said surface becomes somewhat higher than the side portions.

The core may also consist of short pieces provided with apertures, cuts, or openings in one manner or other so as to allow the adhesive to reach the ribs.

It will also be understood that the groove need not be helical, but that it may have another suitable shape, and also that one or several such grooves may be provided to suit various circumstances.

In the construction shown in Figs. 4 and 5 the core consists of a wooden band 12, strip, or the like wound helically, the turns or windings of said band being placed at such distances from one another as to provide a space or clearance 15 between the same. The core also obtains a large central aperture 17 through which the adhesive may flow.

The side faces of the ribs 11 are cut off at the inner edges so as to provide a comparatively spacious wedge-shaped groove 16 between the same rendering it possible for the adhesive to penetrate into the seam and along the outer surface of the core. As mentioned above each rib is provided with a tongue 18 on one side and with a corresponding groove in the other side.

I claim:

1. The method of manufacturing curved rails for hand-rails and the like, which consists in assembling a plurality of pliable ribs into a hollow shell, bending said shell to the desired shape, and pouring an adhesive into said shell.

2. The method of manufacturing curved rails for hand-rails and the like, which consists in assembling a plurality of pliable ribs into a hollow shell, retaining said shell together by suitable means, bending said shell to the desired shape, and pouring an adhesive into said shell.

3. The method of manufacturing curved rails for hand-rails and the like, which consists in assembling a plurality of pliable ribs into a shell around a pliable core provided with a groove, bending said shell to the desired shape, and pouring an adhesive into said groove within said shell.

4. The method of manufacturing curved rails for hand-rails and the like, which consists in assembling a plurality of pliable ribs into a shell around a pliable core consisting of a wooden band wound helically, bending said shell into the desired shape, and pouring adhesive into said core.

ERIK JOHANSSON.